US008967633B2

(12) United States Patent
Drowanowski et al.

(10) Patent No.: US 8,967,633 B2
(45) Date of Patent: Mar. 3, 2015

(54) LEVER SUPPORT ASSEMBLY

(71) Applicants: Andy Drowanowski, Henderson, NV (US); Birgit Drowanowski, Henderson, NV (US)

(72) Inventors: Andy Drowanowski, Henderson, NV (US); Birgit Drowanowski, Henderson, NV (US)

( * ) Notice: Subject to any disclaimer, the term of this patent is extended or adjusted under 35 U.S.C. 154(b) by 0 days.

(21) Appl. No.: 13/843,184

(22) Filed: Mar. 15, 2013

(65) Prior Publication Data

US 2014/0265189 A1    Sep. 18, 2014

(51) Int. Cl.
*B62B 1/12*    (2006.01)
*B62B 1/26*    (2006.01)
*B62B 1/14*    (2006.01)

(52) U.S. Cl.
CPC ... *B62B 1/12* (2013.01); *B62B 1/26* (2013.01); *B62B 1/14* (2013.01); *B62B 2206/04* (2013.01)
USPC .................. 280/47.18; 280/47.19; 280/47.28

(58) Field of Classification Search
CPC ............ B62B 1/00; B62B 1/04; B62B 1/042; B62B 1/06; B62B 1/26; B62B 1/268; B62B 1/125; B62B 2206/00; B62B 2206/02; B62B 2206/04; B62B 1/12; B62B 1/14
USPC .......... 280/47.17–47.19, 47.27, 47.28, 47.24; 211/168–171
See application file for complete search history.

(56) References Cited

U.S. PATENT DOCUMENTS

| | | | | |
|---|---|---|---|---|
| 184,985 | A * | 12/1876 | Rusby | 211/171 |
| 1,345,470 | A * | 7/1920 | Wood | 280/47.27 |
| 3,155,256 | A * | 11/1964 | Cook | 414/445 |
| 3,941,250 | A * | 3/1976 | Ott | 211/1.3 |
| 4,281,849 | A * | 8/1981 | Chandick et al. | 280/655 |
| 4,726,602 | A * | 2/1988 | Sanders et al. | 280/654 |
| 4,781,397 | A * | 11/1988 | Burn | 280/655 |
| 5,518,356 | A * | 5/1996 | Krawczyk | 414/444 |
| 5,632,592 | A * | 5/1997 | Krawczyk | 414/445 |
| 6,109,644 | A * | 8/2000 | Cox | 280/652 |
| 6,135,466 | A * | 10/2000 | Irwin | 280/47.28 |
| 6,709,222 | B2 * | 3/2004 | Inman, Jr. | 414/490 |
| 6,893,029 | B2 * | 5/2005 | Hailston | 280/47.27 |
| D531,376 | S * | 10/2006 | Tetradis | D34/24 |
| 7,219,903 | B2 * | 5/2007 | Grooters et al. | 280/47.27 |

(Continued)

FOREIGN PATENT DOCUMENTS

| | | | | |
|---|---|---|---|---|
| EP | 1227025 A1 * | 7/2002 | | B62B 1/12 |
| EP | 1961692 A2 * | 8/2008 | | B66F 9/14 |

(Continued)

*Primary Examiner* — J. Allen Shriver, II
*Assistant Examiner* — Steve Clemmons
(74) *Attorney, Agent, or Firm* — Ariel S. Bentolila; Bay Area IP Group LLC

(57) ABSTRACT

A support assembly for supporting and moving objects including a lever, such as a dolly, that utilizes a support portion, a base portion, and a fulcrum to support and move an object. The support portion forms a vertical support while the base portion is substantially horizontal. The object engages both portions. A fulcrum tilts the dolly for control and movement. At least one arm extends and retract from the support portion to provide additional surface area for the dolly for supporting heavy or bulky objects. The arms join the support portion at rotatable hinges that allow the arms to incrementally rotate as needed to achieve a desired width or angle for supporting the objects. The arms may also be detachable joined with the dolly. In this manner, the object may utilize the additional surface area of each arm for enhanced stability and leverage.

13 Claims, 6 Drawing Sheets

(56) References Cited

U.S. PATENT DOCUMENTS

| | | | |
|---|---|---|---|
| 8,042,229 B2* | 10/2011 | Wang | 16/270 |
| 8,360,444 B2* | 1/2013 | Colacecchi | 280/47.2 |
| 2002/0096862 A1* | 7/2002 | Fang | 280/652 |
| 2003/0201615 A1* | 10/2003 | Grooters et al. | 280/47.27 |
| 2004/0028512 A1* | 2/2004 | Inman, Jr. | 414/490 |
| 2004/0056438 A1* | 3/2004 | Hailston | 280/47.27 |
| 2010/0200525 A1* | 8/2010 | Keyvanloo | 211/59.2 |
| 2012/0299259 A1* | 11/2012 | Carlson et al. | 280/47.28 |

FOREIGN PATENT DOCUMENTS

| | | | | |
|---|---|---|---|---|
| FR | 2829983 A1 * | 3/2003 | | B62B 1/26 |
| GB | 2392417 A * | 3/2004 | | B62B 1/14 |

* cited by examiner

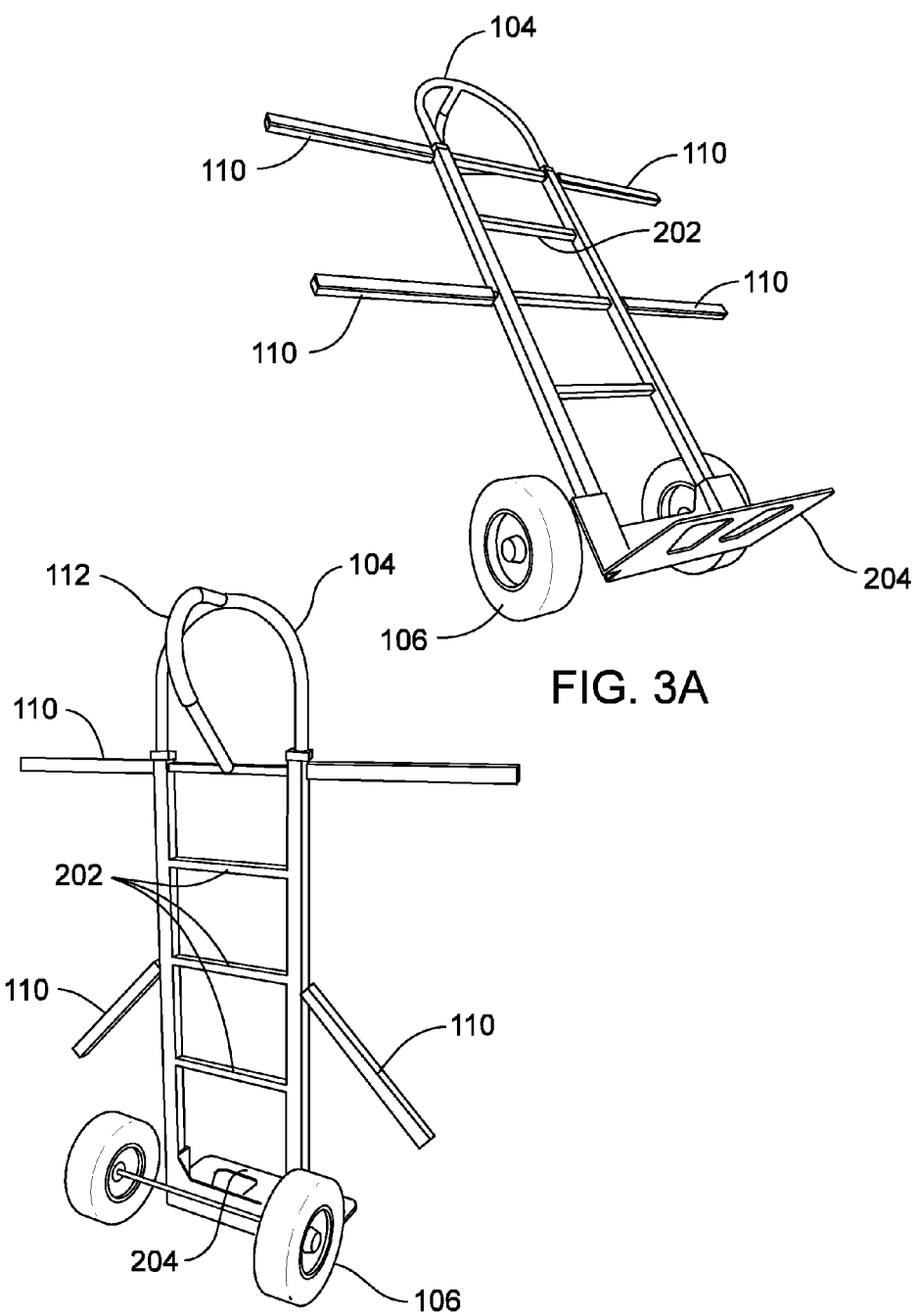

LEVER SUPPORT ASSEMBLY

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to lever support assemblies. More particularly, the invention relates to lever support assemblies with extendable arms that increase support surface area.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that a dolly, also known as a two wheeler, stack truck, hand truck, trolley, trolley truck, sack barrow, sack truck, or bag barrow, is an L-shaped box-moving handcart with handles at one end, wheels at the base, with a small ledge to set objects on, flat against the floor when the dolly is upright. The objects to be moved are tilted forward, the ledge is inserted underneath them, and the objects are then allowed to tilt back and rest on the ledge. Then the dolly and object are tilted backward until the weight is balanced over the wheels, making otherwise bulky and heavy objects easier to move.

Typically, a lever is a machine consisting of a beam or rigid rod pivoted at a fixed hinge, or fulcrum. The lever may amplify an input force to provide a greater output force, thereby producing leverage. The ratio of the output force to the input force is the ideal mechanical advantage of the lever.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A illustrates an exemplary support assembly with an exemplary at least one arm in a retracted position, and FIG. 2B illustrates an exemplary support assembly with an exemplary at least one arm in an extended position, in accordance with an embodiment of the present invention;

FIGS. 3A and 3B illustrate detailed perspective views of an exemplary support assembly with an exemplary at least one arm in various extended positions, where FIG. 3A illustrates an exemplary support assembly with an exemplary at least one arm in a fully extended position, and FIG. 3B illustrates an exemplary support assembly with an exemplary at least one arm in both a partially extended and fully extended position, in accordance with an embodiment of the present invention;

Figure 1:
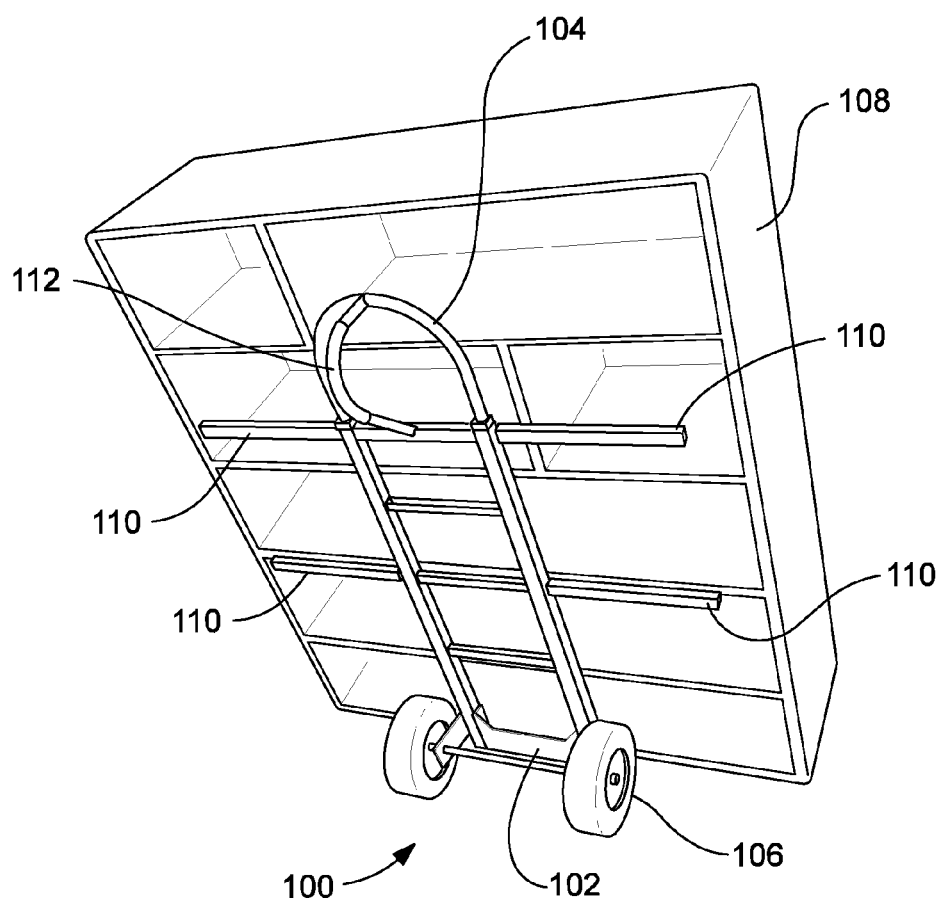
FIG. 1 illustrates a detailed perspective view of an exemplary support assembly supporting an exemplary object, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present application or of any further application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

There are various types of support assemblies that may be provided by preferred embodiments of the present invention. In one embodiment of the present invention, the support assembly may include a lever that utilizes a support portion, a base portion, and a fulcrum to support and move an object. At least one arm may extend from a peripheral portion of the lever for increasing the surface area by which the lever may engage and support the object. In this manner, the object may utilize the additional surface area of each arm on the lever for enhanced stability and leverage.

In one embodiment of the present invention, the lever may include, without limitation, a dolly, a hand truck, a furniture dolly, and a wheel barrel. Those skilled in the art, in light of the present teachings, will recognize that the lever may amplify an input force to provide a greater output force, thereby providing sufficient leverage to move objects such as furniture. In some embodiments, the furniture may be sized and dimensioned, whereby the furniture may extend beyond the peripheral edges of the lever. Consequently, instability and lack of leverage for moving the object may hinder the handling of the object. In one embodiment, the lever may include, without limitation, a support portion. The support portion may provide a substantially vertical surface area for the object to rest on. At least one brace may position perpendicular to the support portion to provide additional support to the object. In some embodiments, the support portion may include a channel on the peripheral portion of the support portion for facilitating the assembly and operation of the at least one arm. The lever may further include a base portion. The base portion may provide a substantially horizontal base for the object to rest on. In operation, the object may be tilted up while the base portion slides underneath and towards the object. In this manner, the object may engage the base portion and the support portion simultaneously. The base portion and the support portion may join at a substantially perpendicular point, thereby forming an angle efficacious for the object to securely rest. In some embodiments, a fulcrum may join the lever in proximity to the point where the support portion and the base portion join. In this manner, the fulcrum may form the point at which the lever pivots. The fulcrum may include, without limitation, wheels, rails, and sleds.

In one embodiment, at least one arm may extend and retract from the peripheral edges of the lever. The at least one arm may be operable to provide additional surface area for supporting a large or heavy object. The at least one arm may further be operable to support and secure large and bulky objects. Those skilled in the art, in light of the present teachings, will recognize that the at least one arm may help prevent the object from falling off the lever, even if the object is large or odd shaped, and even if a user traverses tight areas or uneven terrain. In some embodiments, the at least one arm may extend into an extended position, and then retract back into a retracted position. The at least one arm may be extended incrementally to a desired length. In some embodiments, a hinge may position inside the channel of the support portion. The hinge may be configured to join the at least one arm to the support portion. A hinge arm may extend from the hinge and join with the at least one brace that extend between the support portion. The hinge may incrementally rotate in a plurality of directions along the longitudinal axis of the support portion. In this manner, the at least one arm may extend from the channel to a desired angle and length beyond the support portion of the lever. For example, without limitation, the hinge may pivot or rotate in 10-degree increments while holding a position at each increment. However, in other embodiments, the hinge may allow the at least one arm to rotate a full 90 degrees. In this manner the at least one arm may be oriented to a desired angle for supporting the object.

FIG. 1 illustrates a detailed perspective view of an exemplary support assembly supporting an exemplary object, in accordance with an embodiment of the present invention. In the present invention, a support assembly 100 may include a lever 102 that utilizes a support portion 104, a base portion, and a fulcrum portion 106 to support and move an object 108. At least one arm 110 may extend from a peripheral portion of the lever for increasing the surface area by which the lever may engage and support the object. In one embodiment, the four arms may extend from the support portion and be sized 12" long. However, in another embodiment, each arm may have a different length and width. In this manner, the object may utilize the additional surface area of each arm on the lever for enhanced stability and leverage. In some embodiments, four arms may rotate to an extended position from the support portion of the lever. The at least one arm may be lined with vinyl or rubber to provide grip and protect the object from damage. However, in other embodiments, more or less arms may be utilized depending on the requirement of the user. In some embodiments, the lever may include, without limitation, a dolly, a hand truck, a furniture dolly, a floor cart, and a wheel barrel. Those skilled in the art, in light of the present teachings, will recognize that the lever may amplify an input force to provide a greater output force, thereby providing sufficient leverage to move objects such as furniture. In some embodiments, the furniture may be sized and dimensioned, whereby the furniture may extend beyond the peripheral edges of the lever. Consequently, instability and lack of leverage for moving the object may hinder the handling of the object. In some embodiments, a handle 112 may position on the support portion to facilitate control of the support assembly. Suitable materials for fabricating the support assembly include, without limitation, aluminum, steel, metal alloys, fiberglass, plastic, and wood.

Figures 2A, 2B:
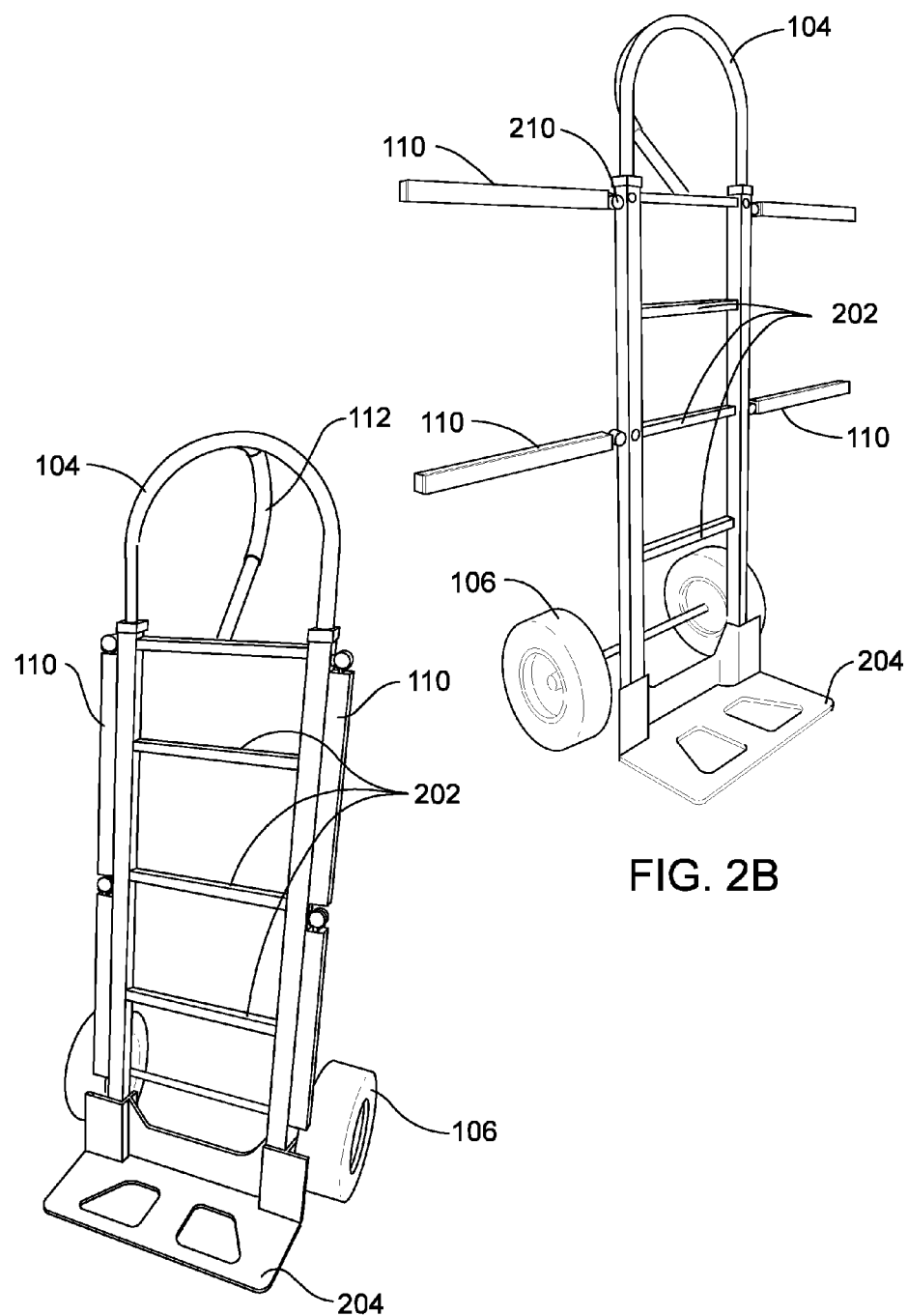
FIGS. 2A and 2B illustrate detailed perspective views of an exemplary support assembly, where

FIGS. 2A and 2B illustrate detailed perspective views of an exemplary support assembly, where FIG. 2A illustrates an exemplary support assembly with an exemplary at least one arm in a retracted position, and FIG. 2B illustrates an exemplary support assembly with an exemplary at least one arm in an extended position, in accordance with an embodiment of the present invention. In the present invention, the lever may include, without limitation, a support portion. The support portion may provide a substantially vertical surface area for the object to rest on. In one embodiment, the support portion may include two parallel rods sized 50"×21". However larger or smaller support portions may be utilized. At least one brace 202 may position perpendicular to the support portion to provide additional support to the object. In some embodiments, the support portion may include a channel on the peripheral portion of the support portion for facilitating the assembly and operation of the at least one arm. The lever may further include a base portion 204. The base portion may provide a substantially horizontal base for the object to rest on. In operation, the object may be tilted up while the base portion slides underneath and towards the object. In this manner, the object may engage the base portion and the support portion simultaneously. The base portion and the support portion may join at a substantially perpendicular point, thereby forming an angle efficacious for the object to securely rest. In some embodiments, a fulcrum portion may join the lever in proximity to the point where the support portion and the base portion join. The fulcrum portion may form the point at which the lever pivots. Those skilled in the art, in light of the present teachings, will recognize that the support portion and the base portion may tilt on the fulcrum to various angles efficacious for leveraging and balancing the object. The full weight of the object may then be more easily balanced. The fulcrum portion may include, without limitation, wheels, rails, and sleds. In one embodiment, the wheels may be sized 8" in diameter. In some embodiments, the at least one arm may rotate to retract and extend from a peripheral portion 210 of the support portion. The at least one arm may rotate to a retracted position 206 when not in use. The at least one arm may also extend to an extended position 208 when additional surface area for supporting and moving an object is required. Each arm may incrementally rotate to a desired angle and width depending on the size of the object and the amount of space available to traverse.

FIGS. 3A and 3B illustrate detailed perspective views of an exemplary support assembly with an exemplary at least one arm in various extended positions, where FIG. 3A illustrates an exemplary support assembly with an exemplary at least one arm in a fully extended position, and FIG. 3B illustrates an exemplary support assembly with an exemplary at least one arm in both a partially extended and fully extended position, in accordance with an embodiment of the present invention. In the present invention, at least one arm may extend and retract from the peripheral edges of the lever. The at least one arm may be operable to provide additional surface area for supporting a large or heavy object. The at least one arm may further be operable to support and secure large and bulky objects. Those skilled in the art, in light of the present teachings, will recognize that the at least one arm may help prevent the object from falling off the lever, even if the object is large or odd shaped, and even if a user traverses tight areas or uneven terrain. In some embodiments, the at least one arm may extend into an extended position, and then retract back into a retracted position. The at least one arm may be extended incrementally to a desired length. Those skilled in the art, in light of the present teachings, will recognize that by allowing the at least one arm to extend only as much as needed, the object may be secured while still allowing the user to easily navigate through doorways, hallways, and tight areas. In one alternative embodiment, the lever may not include a support portion or a fulcrum portion, whereby the at least one arm may extend from the base portion and a plurality of wheels may be operable to transport the support assembly.

Figure 4:
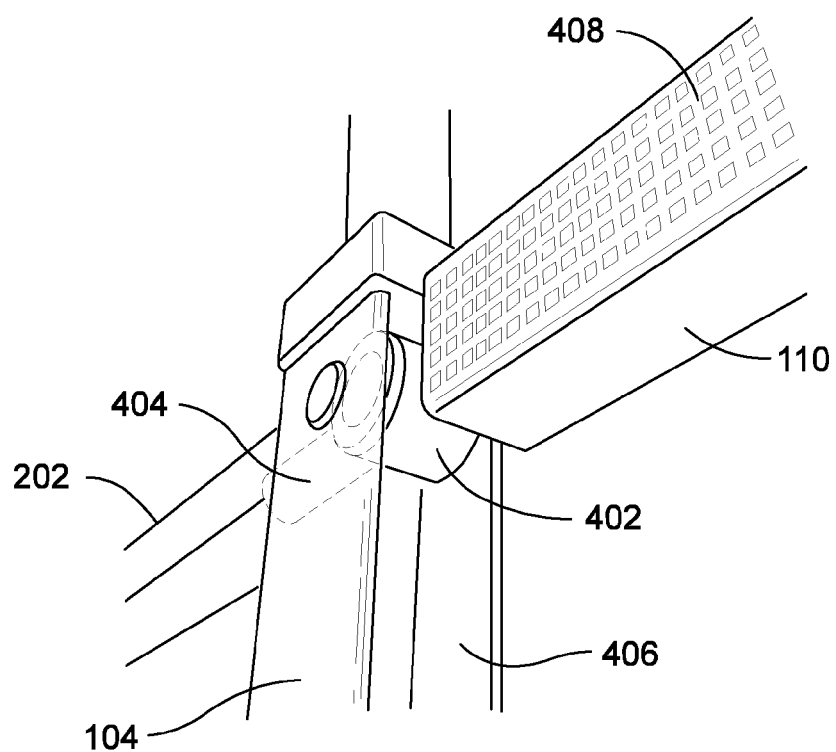
FIG. 4 illustrates a sectioned view of an exemplary hinge joined with an exemplary support portion through a hinge arm and at least one brace, in accordance with an embodiment of the present invention.

FIG. 4 illustrates a sectioned view of an exemplary hinge joined with an exemplary support portion through a hinge arm and at least one brace, in accordance with an embodiment of the present invention. In the present invention, a hinge 402 may position inside a channel 406 of the support portion. The hinge may be configured to join the at least one arm to the support portion. A hinge arm 404 may extend from the hinge and join with the at least one brace that extend between the support portion. The hinge may incrementally rotate in a plurality of directions along the longitudinal axis of the support portion. In this manner, the at least one arm may extend from the channel to a desired angle and length beyond the support portion of the lever. For example, without limitation, the hinge may pivot or rotate in 10 degree increments while holding a position at each increment. However, in other embodiments, the hinge may allow the at least one arm to rotate a full 90 degrees. In this manner the at least one arm may be oriented to a desired angle for supporting the object. In one alternative embodiment, the at least one arm may telescopically extend and retract from the support portion of the lever. In yet another alternative embodiment, the at least one arm may include a rigid rod that detachably joins with the support portion or the base portion of the lever. In some embodiments, the at least one arm may include a support surface 408 configured for providing grip and securing the object. The support surface may further protect the object from damage while engaged with the at least one arm, including, without limitation, nicks, cuts, and scrapes. Suitable materials for the support surface may include, without limitation, a textured rubber coating, a polymer synthetic, a hook and loop fastener, and an adhesive.

Figure 5:
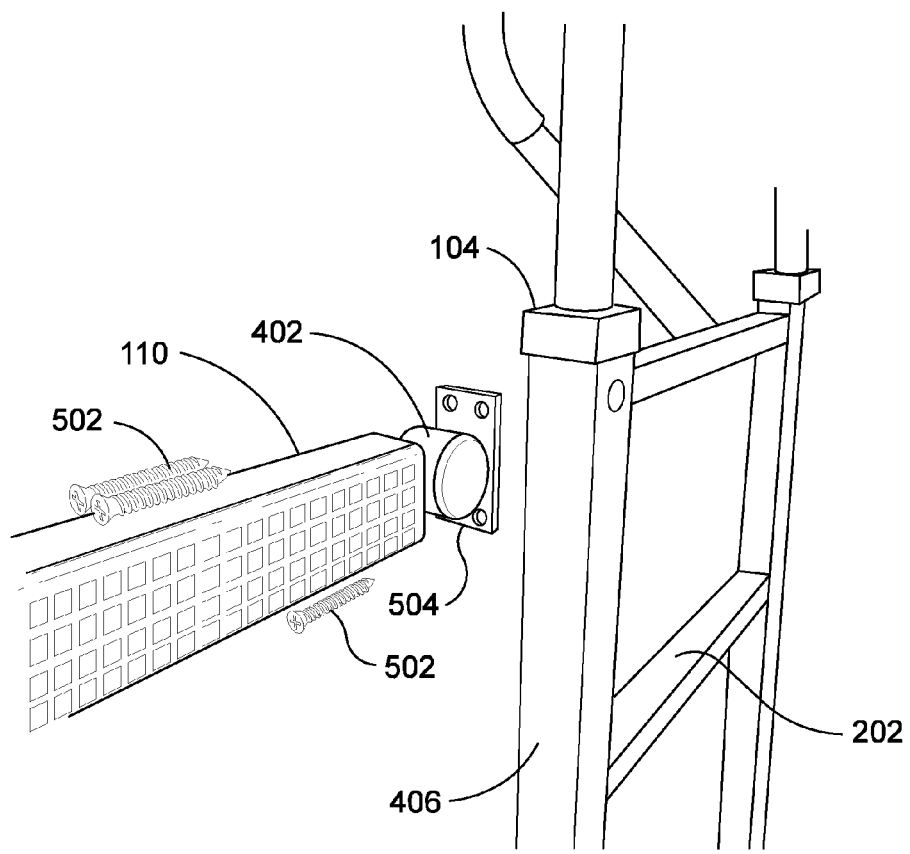
FIG. 5 illustrates a blow up view of an exemplary at least one arm positioned to join with an exemplary lever, in accordance with an embodiment of the present invention.

FIG. 5 illustrates a blow up view of an exemplary at least one arm positioned to join with an exemplary lever, in accordance with an embodiment of the present invention. In the present invention, the at least one arm may be interchangeable and join with various levers. At least one fastener 502 may secure each arm with the support portion of the desired lever. The at least one fastener may include, without limitation, a screw, a magnet, a clip, a rope, and an adhesive. In this manner, the support assembly may be constructed with different types of levers and different uses. A support bracket 504 may position between the at least one fastener and the support portion to provide additional stability. The support bracket may join the support portion at a desired height, depending on the type of object supported. In some embodiments, the support bracket may join with the hinge, whereby the hinge may rotate off of the support bracket. In some embodiments, the support bracket may include at least one aperture for the at least one fastener to pass through. The support bracket may include, without limitation, a hinged bracket, a concave bracket, and a square bracket. Those skilled in the art, in light of the present teachings, will recognize that when the at least one arm detachably joins the support portion, the at least one arm may slightly protrude from the peripheral portion of the support portion since the channel may not be utilized. However, in embodiments where the support assembly is constructed with the at least one arm, the at least one arm may retract into the channel and form a flush surface with the support portion.

Figure 6:
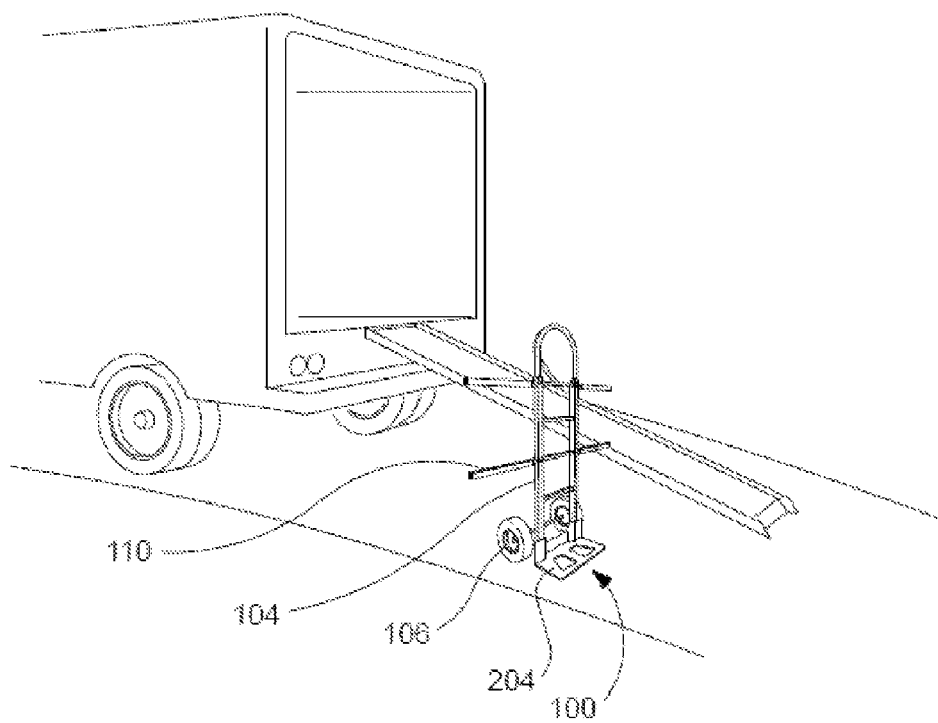
FIG. 6 illustrates a detailed perspective view of an exemplary support assembly in position to transport furniture from a moving van, in accordance with an embodiment of the present invention.

FIG. 6 illustrates a detailed perspective view of an exemplary support assembly in position to transport furniture from a moving van, in accordance with an embodiment of the present invention. In the present invention, the support assembly may be utilized for supporting and moving bulky or large object when the lever by itself is not sufficiently sized to do so. For example, without limitation, the at least one arm may extend to support furniture, including, without limitation, sofas, book cases, beds, and dinning tables. In one alternative embodiment, the at least one arm may be configured to wrap around the object to provide additional security. In yet another alternative embodiment, each arm may be extended or retracted remotely. In yet another alternative embodiment, each arm may include spikes that pass through the object for additional security. In yet another alternative embodiment, a sensor may extend and retract each arm according to the size and dimension of the object, and the space available to traverse the object.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing arms that extend from a lever to increase surface area for supporting large and bulky objects according to the present invention will be apparent to those skilled in the art. Various aspects of the invention have been described above by way of illustration, and the specific embodiments disclosed are not intended to limit the invention to the particular forms disclosed. The particular implementation of the arms that extend from a lever to increase surface area for supporting large and bulky objects may vary depending upon the particular context or application. By way of example, and not limitation, the arms that extend from a lever to increase surface area for supporting large and bulky objects described in the foregoing were principally directed to rotatable hinged arms that extend and retract from a dolly implementations; however, similar techniques may instead be applied to the beds of pickup trucks to extend the surface area when carrying long or bulky objects, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:
1. An assembly comprising:
a lever, said lever being configured to substantially support an object;

a fulcrum portion, said fulcrum portion being configured to pivot said lever; and at least one arm, said at least one arm being disposed into engagement with said lever, said at least one arm being configured to provide additional surface area to said lever, said at least one arm comprising a generally extended position, said at least one arm further comprising a generally retracted position, said at least one arm further comprising a hinge, wherein said hinge is disposed to position inside a channel, said hinge comprises a hinge arm, wherein said hinge arm being configured into engagement with at least one brace, said hinge further comprises a support bracket, said support bracket being configured into engagement with said at least one arm with said support portion, said hinge further comprises at least one fastener, said at least one fastener being configured to substantially secure said support bracket against said support portion.

2. The assembly of claim 1, in which said lever comprises a dolly.

3. The assembly of claim 1, in which said lever comprises a support portion, said support portion being disposed to position in a substantially vertical position.

4. The assembly of claim 3, in which said support portion comprises at least one brace.

5. The assembly of claim 4, wherein said at least one brace is disposed to position perpendicular to said support portion.

6. The assembly of claim 5, in which said support portion comprises a channel.

7. The assembly of claim 6, wherein said channel is disposed to position along a peripheral portion of said support portion.

8. The assembly of claim 7, in which said support portion comprises a handle.

9. The assembly of claim 8, wherein said handle is configured to be operable to control said assembly.

10. The assembly of claim 1, in which said lever comprises a base portion, said base portion being disposed to position in a substantially horizontal position, said base portion further being disposed to join with said support portion at a substantially perpendicular point.

11. The assembly of claim 1, in which said fulcrum portion comprises at least one wheel.

12. An assembly comprising:

means for substantially positioning an object on a lever;

means for engaging at least one arm with a support portion;

means for extending said at least one arm to substantially engage said object, said at least one arm comprises a hinge, wherein said hinge is disposed to position inside a channel, said hinge comprises a hinge arm, said hinge arm being configured into engagement with said at least one brace;

means for tilting said lever on a fulcrum portion; and means for moving said assembly and said object.

13. An assembly comprising of:

a lever, said lever being configured to support an object, said lever comprising a dolly, said lever further comprising a support portion, said support portion being disposed to position in a substantially vertical position, said support portion comprising at least one brace, said at least one brace being disposed to position perpendicular to said support portion, said support portion further comprising a channel, said lever further comprising a base portion, said base portion being disposed to position in a substantially horizontal position;

a fulcrum portion, said fulcrum portion being configured to pivot said lever, said fulcrum portion comprising at least one wheel; and at least one arm, said at least one arm being disposed to join with said lever, said at least one arm being configured to provide additional surface area to said lever, said at least one arm comprising an extended position, said at least one arm further comprising a retracted position, said at least one arm comprising a hinge, said hinge being operable to rotate, wherein said hinge is disposed to position inside a channel, said hinge comprising a hinge arm, said hinge arm being configured to join with said support portion, said hinge arm further being configured into engagement with said at least one brace.

* * * * *